Figure 1:
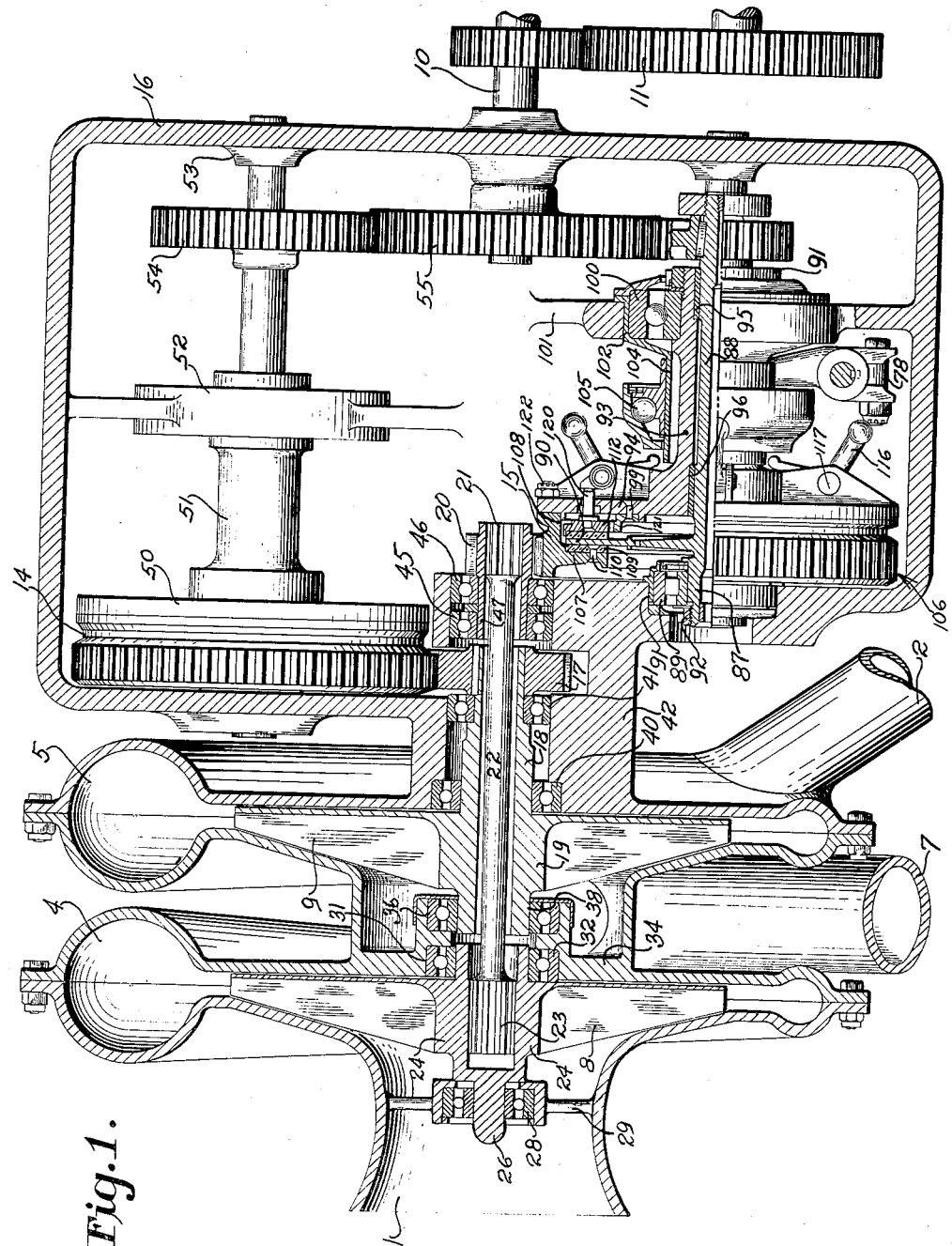

April 23, 1935.  D. GREGG  1,998,778
SUPERCHARGER
Filed Dec. 12, 1930　　2 Sheets-Sheet 2
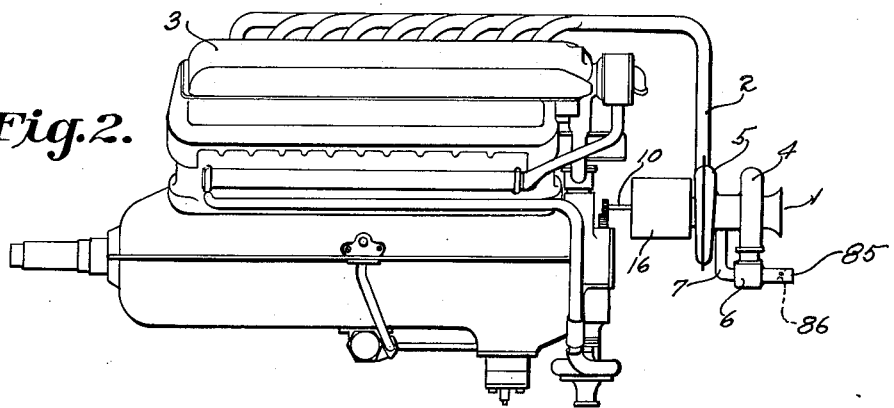
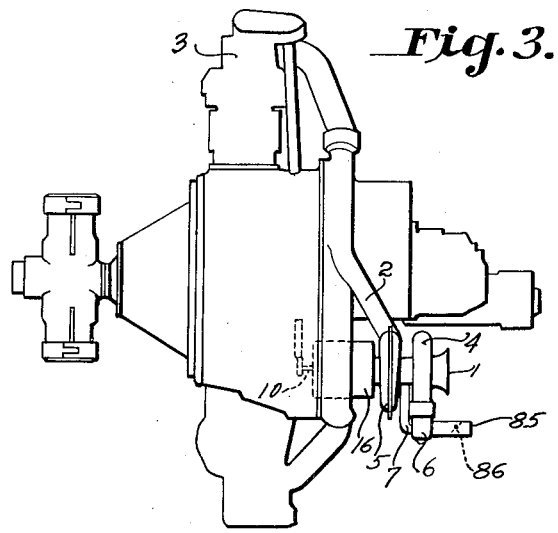
INVENTOR
David Gregg.
BY
ATTORNEY Patented Apr. 23, 1935

1,998,778

UNITED STATES PATENT OFFICE 1,998,778

SUPERCHARGER

David Gregg, Caldwell, N. J., assignor to Eclipse Aviation Corporation, East Orange, N. J., a corporation of New Jersey Application December 12, 1930, Serial No. 501,943

8 Claims. (Cl. 123—119)

This invention relates to supercharging systems and particularly to systems and devices for supplying a proper amount of air for use in supporting combustion in explosion engines such as are used in aeronautical and other automotive devices.

An object of the invention is to provide novel means for controlling the pressure of air passing into the cylinders of an internal combustion engine.

A further object is to provide in a device of the foregoing character, novel means for compressing the air charge and for combining the air with the fuel charge as the two substances are conducted to the cylinders of the engine.

Another object of the invention is to provide a supercharger of novel construction which will be highly efficient as a means for conveying suitable quantities of compressed air to the cylinders of the engine in such a manner as to enable the operator of the engine to obtain the maximum performance therefrom.

Another object of the invention is to provide a novel supercharger of the centrifugal compressor type in which the volume of air compressed and fed to the engine may be varied at will and also in the proper manner.

Another object is to provide in a device of the foregoing character novel means for actuating the supercharger at variable speed in accordance with the speed of the engine.

A further object of the invention is to provide a novel construction of multi-stage supercharger employing a plurality of impeller units capable of joint or individual operation and control.

A further object of the invention is to provide in a device of the foregoing character, novel means for cutting out one or more of the impeller units from operative influence upon the compressed air charge.

A further object of the invention is to provide in a device of the foregoing character, novel means for varying the mixture of compressed air and fuel admitted to the engine together with novel means for diffusing and distributing such mixture.

Still another object of the invention is to provide a novel practical, efficient and compact construction which will be light of weight, relatively simple to manufacture and install, and readily accessible for inspection, removal, or replacement of parts.

Other objects and features of the invention will become apparent upon inspection of the following specification wherein is illustrated the preferred embodiment of the invention.

It is to be expressly understood, however, that the drawings are intended merely to serve the purpose of illustrating one mode of embodying the invention with the practical form and are not to be considered as a definition of the limits of the invention, reference being had for this purpose to the appended claims.

In the accompanying drawings wherein like reference characters refer to the corresponding parts throughout the several views, Fig. 1 is a central longitudinal sectional view of the structure embodying the invention;

Fig. 2 is a view in elevation of the structure shown in Fig. 1 as it appears in operative relation to an internal combustion engine; and Fig. 3 shows the invention applied to an internal combustion engine of the radial cylinder type.

Referring to the drawings, the invention is shown as embodied in a supercharger assembly to which air is admitted through a suitable entrance member indicated at 1, the air being impelled through the chambers and parts to be described, and then passing by way of a suitable conduit 2, to the intake manifold of an internal combustion engine, such as is indicated at 3.

The supercharger of the present invention is preferably of the multi-stage type employing a plurality of chambers through which the charge of fuel or air for the engine may pass, in series or otherwise, for the purpose of imparting thereto any desired pressure and velocity suitable to the foregoing needs arising from a variation in the conditions to which the engine is called upon to respond. As shown for the purpose of illustration, the supercharger specifically described herein is provided with two such chambers as indicated at 4 and 5, the former being located adjacent the entrance chamber 1 so that the incoming air passes first through such chamber and then preferably to a carburetor or equivalent means in which the fuel supply may be combined with the air supply, the combined charge being led by suitable means such as the passage 7 to the second impeller chamber 5, from which point the compressed and diffused charge is caused to pass (assuming that the chamber 5 is the last of the series of chambers which may be of any desired number, although only two such chambers are illustrated) to the conduit 2 leading to the engine 3.

Each of the chambers is preferably provided with a compressor or impeller unit as shown at 8 and 9, these impellers being adapted to be actuated by suitable driving means 10, actuated by an appropriate speed multiplying gearing 11, which is in turn driven from a suitable rotating member of the engine 3.

Novel means are provided for rendering the impellers 8 and 9 effective alternately or simultaneously, whereby the volume and pressure of the air charge may be varied in accordance with the requirements of the engine and in accordance with the speed thereof. As shown, such means includes two separately operable driving gears 14 and 15, the former being adapted to drive the pinion 17 secured to a sleeve member 18 constituting an extension of a hub 19 of impeller 9, and the latter gear 15 being adapted to drive a pinion 20 secured to the shaft 22 by the provision of splines or other suitable means 21, the shaft 22 being similarly keyed at its opposite end by means 23, to the hub 24 of the impeller unit 8.

Suitable supporting means for the shaft 22 and the impeller 8 are provided as shown in the form of cross-frame 29 formed of radially disposed arms spaced apart to permit the passage of the air and having a central opening for the reception of the extension 26 and of hub 24, suitable bearings for the hub being provided as indicated at 28 and 32, the latter being provided in the recess 31 formed in the frame member 34. Similar bearing means 36 are provided in the member 34 and constitute a means for supporting the end 38 of hub 19, the portion 18 of the said hub being provided with additional bearing means 40 and 41 located in the portion 42 connecting the wall of chamber 5 with the casing 16. The member 42 also constitutes a supporting means for the bearings 45 and 46 in which the extending sleeve 47 of pinion 20 rotates.

From the foregoing it is apparent that means are provided for causing gear 14 to drivably engage the impeller 9 of chamber 5 while gear 15 is adapted to drivably engage the impeller 8 of chamber 4.

Under normal conditions it will not be necessary to maintain both the impellers 8 and 9 in driven engagement with the driving members just referred to. In fact, assuming the device to be installed on airplanes or airships, it may not be necessary or desirable to drive either of the impellers while the vehicle is travelling at relatively low altitudes, the atmospheric pressure at such low altitude being sufficient to maintain a proper supply of a combustible mixture to the engine. As illustrated herein, however, it is preferred to provide means for maintaining one of the impellers, for example, the impeller 9, in continuous operation, and ultimately, upon the attainment of a relatively high altitude, to place the second impeller 8 in operation. When this latter condition is attained, the operation of the second impeller 8 will serve to increase the compressing and commingling action of the first impeller 9 thereby maintaining sufficient pressure within the intake manifold of the engine to maintain the engine in effective operation notwithstanding the high altitude.

The preferred means, as shown, for holding the first impeller 9 in operating condition, comprises a friction engaging clutch mounted in a suitable housing 50, secured to the shaft 51 journaled in the casing 16 on suitable bearings as indicated at 52 and 53, the shaft 51 being provided with a gear 54 affixed thereto and adapted to mesh with the gear 55, on shaft 10. Thus the impeller 9 is adapted to be yieldingly driven at all times during operation of the engine and therefore operative to effect a commingling of the mixture of air and fuel passing to the conduit 7 into the chamber containing the impeller 9 and serves to impart to such mixture an increased pressure greater than the atmospheric pressure whereby the engine will be caused to operate at a power equal to that attainable at lower levels.

When a higher altitude is reached, the impelled 9 becomes ineffective to produce the same power, and it is desirable to provide means whereby the operator may throw the second impeller 8 into operation and thus produce an increased pressure which will compensate for the drop in atmospheric pressure. The preferred means for effecting this result comprises, as shown, a yielding clutch mechanism consisting of a circular disc 90 rigidly fixed to or forming an integral part of shaft 88 (Fig. 1) the disc being disposed at substantially right angles to the axis of the shaft. The latter is rotatably supported at its outer end in bearing 89 mounted in a recessed hub formed in the casing. Suitable retaining sleeves 91 and threaded means 92 are provided for maintaining the bearing 89 in its proper position. The shaft 88 extends through a hollow shank 93 of a weight carrying member 94 and is rotatably supported at one end of the hollow shank by bearing 95, pressed into an inner recess of the shank 93. The weight carrying member 94 is rotatably supported on an enlarged portion of shaft 88 by means of the bearing 96 pressed into a recess in the hollow shank 93, the bearing 96 being held from longitudinal movement by gear 121, rotatable on shaft 88 and rigidly fixed to the outer face of the weight carrying member 94 by suitable means such as rivets 99, the inner end of hollow shank 93 being rotatably supported in bearing 100 mounted in a suitable bracket 101 of casing 16 and retained in its proper position by means of a cylindrical retaining sleeve 102. The latter is provided with a barrel-shaped extension 104, on which is loosely mounted a thrust bearing 105, the purpose of which will later be described.

The combined clutch and gear member 15 is rigidly fixed to the outer face and adjacent the periphery, of the weight carrying member 94 by means of bolts 122. The outer periphery of the member 15 is shaped to form a spur gear 106 and is provided with an inwardly extending annular flange 107 spaced apart from and forming a recess 108 between the outer face of the member 94. The inner face of the flange is provided with an annular frictional element 109 secured thereto by means of rivets 110. The annular disc 112 is disposed within the recess 108 and is associated with said frictional element 109. The inner periphery of disc 112 is provided with teeth to form an internal gear which meshes with the gear 121 to prevent relative rotation of the gear 121 and disc 112, but permitting longitudinal movement therebetween. The opposed faces of the frictional elements 109 and 112 are adapted to receive a portion of the disc 90 adjacent its periphery and to permit relative rotation therebetween so long as the clutch is in open position.

The frictional engagement of the clutch elements is obtained by means of pivoted bell crank levers 116, the outer arms of which are enlarged to form centrifugal weights. Levers 116 are pivotally mounted on suitably journaled axles 117 carried by member 94. Means are provided on the rocking levers for engagement with longitudinally movable pins 120, the inner ends of said pins having engagement with disc 112, spring means (not shown) being provided, if desired, to constantly urge the levers into contact position with a predetermined pressure. Likewise, the clutch faces may, if desired, be so designed as to constantly exert a small amount of frictional pressure, one against the other, even when the weighted levers are in non-driving position. Any suitable number of weighted levers are employed to distribute the pressure uniformly about the clutch discs. The levers may be moved about their pivots by moving thrust bearing 105 outwardly into engagement with the inner arms of the bell crank levers. Any convenient manual means (not shown) may be employed for actuating a member 78 to move the bearing 105 into or out of contact with the levers.

During normal operation as above explained, the impeller 9 is yieldingly driven through clutch means 50 and therefore constitutes a continually operable supercharger for supplying fuel to the engine cylinders by way of the chamber 4, conduit 7, chamber 5 and fuel pipe 2. During such operation, the impeller 8 remains in disconnected relation with the engine and therefore the impeller 9 is supplied with fuel through the carburetor 6 at atmospheric pressure by way of opening 85 in which is located a suitable manually operable throttle valve 86. When an altitude is reached such that the impeller 9 is ineffective to maintain the desired pressure in the intake manifold of the engine, member 78 may be actuated to move bearing 105 out of engagement with the inner arms of levers 116, to permit free action of the centrifugal weights whereby the clutch is engaged to drive the second impeller 8 through the gears 15 and 20 and shaft 22. Impeller 8 now co-acts with impeller 9 to provide the desired pressure in the intake manifold. The engine will therefore remain in operation under the influence of the joint compressing action of the two impellers 8 and 9 until such time as the control member is actuated to move the centrifugal weights to inoperative condition, permitting the clutch to slip and the operation of the impeller 8 to be discontinued. As soon as the speed of the second supercharger 8 is retarded, a variation will of course be produced in the volume of air fed to the engine and therefore in the density of the mixture of air and fuel. This variation may be offset if desired by changing the setting of the throttle.

From the foregoing it will be apparent that there is thus provided a method and apparatus for increasing a variable supercharging action by the use of a plurality of individually or jointly operable impeller units disposed in tandem and coaxial relation in a structure separate from the structure of the engine and therefore capable of use on engines of different design without modification. This fact renders the device capable of manufacture without the necessity of making special provisions for each different installation. An important economy in time and expense of production and supervision is thereby effected. It is to be understood, however, that changes may be made in the embodiment of the invention to suit different requirements or for other reasons without departing from the scope or spirit of the invention as herein disclosed. Thus it is to be understood that the invention is not confined to the use of only two impeller units, it being possible and contemplated that the number will be increased in order to obtain a greater pressure and commingling action and also to obtain greater flexibility in the control thereof. It will be further apparent to those skilled in the art, that the invention may be readily applied to other types of internal combustion engines, one such other application being illustrated in Fig. 3.

Likewise other changes, modifications, substitutions, additions and omissions may be made in the construction, arrangement and manner of operation of the parts, without departing from the limits or scope of the invention as defined in the appended claims.

What is claimed is:

1. In a supercharging system for use with combustion engines, a plurality of compressors disposed in coaxial alignment and operatively connected in series, a hollow shaft for continuously driving one of said compressors actuated by a rotating member of the associated engine, a second shaft within said first named shaft for driving another of said compressors, means for rendering said second shaft effective at the will of the operator, and manually controlled means for bypassing fluid flow around the second compressor.

2. In combination, a pair of fluid compressing means operatively connected in series, a pair of telescoped driving shafts for said compressing means yielding means for continuously driving one of said compressing means, and manually controlled means for driving the other compressing means at a speed in excess of that at which the first compressing means is driven.

3. In apparatus of the class described, in combination with a member driven by an internal combustion engine, a carburetor for mixing fuel and air for delivery to said engine, means continuously driven by said driving member for compressing said mixture and for delivering same to said engine, means for conducting the supply of air to said carburetor including a chamber open to the atmosphere, and a second means located in said chamber for compressing said supply of air as it passes through said chamber on its way to said carburetor, said means comprising a rotary compressor disposed in axial alignment with said continuously driven means, concentric telescoped driving shafts for the continuously driven means and the compressor, and means for rendering said rotary compressor effective at will.

4. In combination with an engine, a compressor having a shaft continuously drivably connected to the engine, a second compressor having a shaft extending through and coaxial with said first named shaft, releasable means for drivably connecting and disconnecting the second named shaft with the engine, and means for positively controlling said releasable means.

5. In combination with an engine, a compressor having a shaft continuously drivably connected to the engine, a second compressor having a shaft extending through and coaxial with said first named shaft, centrifugally operated yielding means for drivably connecting and disconnecting the second named shaft with the engine, and means for positively controlling said centrifugally operated yielding means.

6. In a unitary detachable supercharger and drive mechanism, a housing therefor, a pair of compressors, a drive shaft for each compressor, said shafts being arranged in concentric relation, means for driving said shafts at different speed ratios including a third shaft projecting through the housing and adapted to be connected to a source of power, and means for operatively disconnecting the compressor having the higher driving speed ratio from the third shaft.

7. In a unitary detachable supercharger and drive mechanism, a housing therefor, a pair of compressors having the inlet of one compressor connected to the outlet of the other compressor, driving shafts for the compressors arranged in concentric relation, means for driving one of said compressors at a higher speed than the other including a third shaft projecting through the housing and adapted to be connected to a source of power, means for disconnecting the compressor that is driven at the higher speed, and means for connecting the inlet of the slower driven compressor to the atmosphere around the higher speed compressor.

8. In a unitary detachable supercharger and drive mechanism, a housing therefor, a pair of compressors having the inlet of one compressor connected to the outlet of the other compressor through a charge forming device interposed therebetween, driving shafts for the compressors arranged in concentric relation, means for driving one of said compressors at a higher speed than the other including a third shaft projecting through the housing and adapted to be connected to a source of power, means for disconnecting the compressor that is driven at the higher speed, and means for connecting the inlet of the slower driven compressor to the atmosphere around the higher speed compressor and through the charge forming device.

DAVID GREGG.